(No Model.)
J. T. GIBLIN.
CHUCK FOR EMERY WHEELS.
No. 523,890. Patented July 31, 1894.
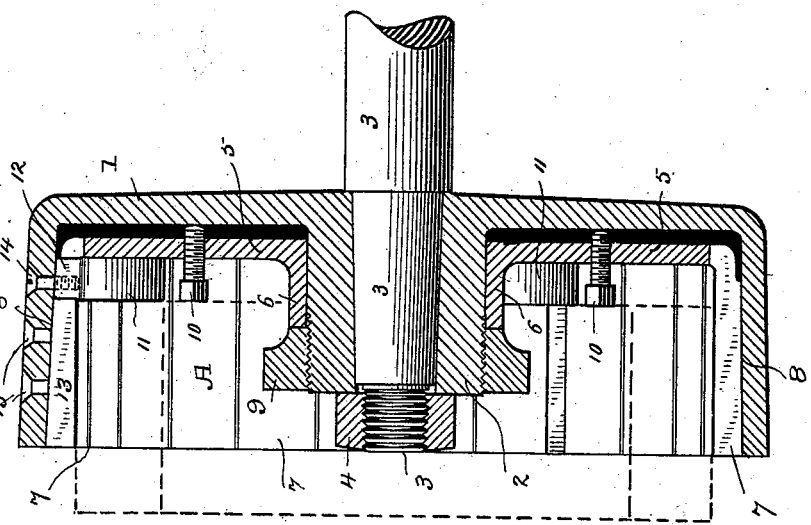
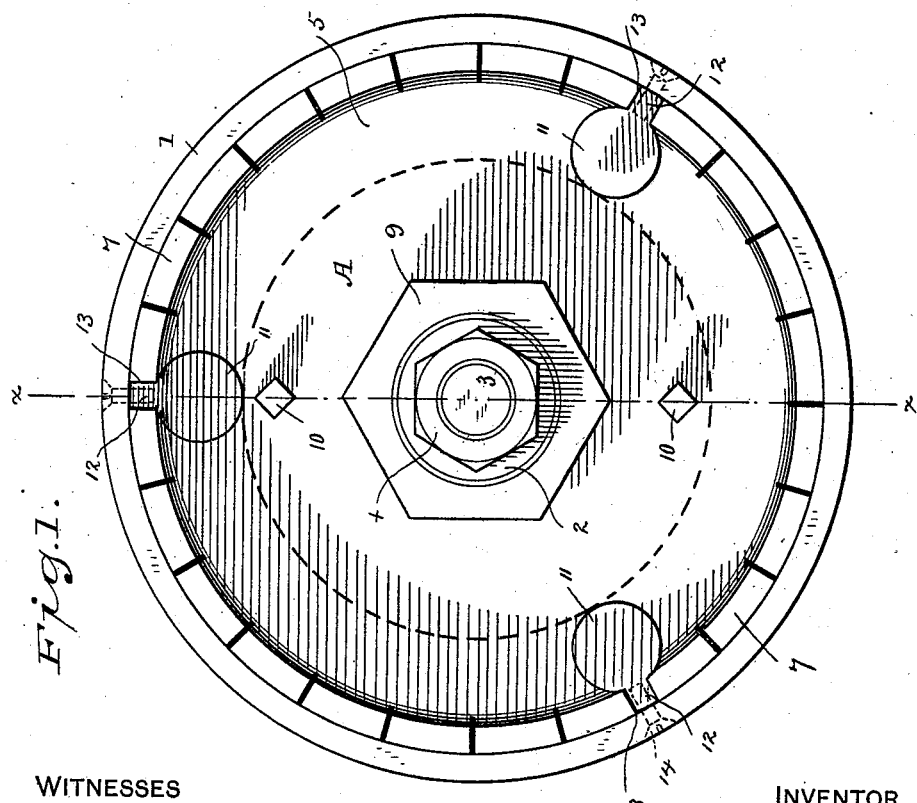
WITNESSES
H. H. Lamb
Pearl Reynolds
INVENTOR
John T. Giblin
By
A. M. Wooster
Atty.

UNITED STATES PATENT OFFICE.

JOHN T. GIBLIN, OF BRIDGEPORT, CONNECTICUT, ASSIGNOR OF ONE-HALF TO THE SPRINGFIELD EMERY WHEEL COMPANY, OF SAME PLACE.

CHUCK FOR EMERY-WHEELS.

SPECIFICATION forming part of Letters Patent No. 523,890, dated July 31, 1894.

Application filed December 21, 1893. Serial No. 494,250. (No model.)

*To all whom it may concern:*

Be it known that I, JOHN T. GIBLIN, a citizen of the United States, residing at Bridgeport, in the county of Fairfield and State of Connecticut, have invented certain new and useful Improvements in Chucks for Emery-Wheels; and I do hereby declare the following to be a full, clear, and exact description of the invention, such as will enable others skilled in the art to which it appertains to make and use the same.

My invention has for its object to produce a chuck for holding emery wheels which shall be so constructed as to utilize the principle of centrifugal force in holding the wheels in place, the tendency of the wheels to burst however being wholly overcome by the construction of the chuck itself.

It is of course well understood that for many uses cylindrical emery wheels are desirable, the grinding action being performed by the ends of the cylinders.

In order to provide a chuck that will hold an emery wheel so firmly and securely that the danger of bursting is practically eliminated even when the wheel is rotated at five or six times any velocity that has heretofore been possible, I have devised the novel chuck which I will now describe referring by numbers and letters to the accompanying drawings, forming part of this specification, in which—

Figure 1 is a face view of my novel chuck with the emery wheel removed, the position of the inner periphery of the emery wheel being indicated by a dotted line, and Fig. 2 is a section on the line $xx$ in Fig. 1, the emery wheel indicated by dotted lines.

1 denotes the cup or body of the chuck which is provided with a central hub 2 having a screw thread at its outer end. This cup or body is secured at the end of a shaft 3 in any suitable manner as for example by a nut 4 engaging a screw thread at the end of the shaft and bearing upon hub 2.

The chuck proper which I designate by A consists of a disk 5 having a central sleeve 6 which is adapted to slide over hub 2 and having at its edge spring arms 7 which lie at approximately a right angle to the plane of the disk. The outer edges of these arms are inclines as at 8 and bear against the inner periphery of the cup or body which is itself an incline the taper being downward and inward from the edge of the cup toward the bottom. The chuck proper, that is the disk and spring arms, may be made in any suitable manner, for example the disk may be a separate piece and the spring arms secured thereto. This construction is so obvious that I have not deemed it necessary to require illustration in the drawings. I preferably however form the disk with a flange at its outer edge and form the arms by making cuts in the flange as indicated in the drawings. In ordinary use nut 4 does not have to be removed.

To remove or insert an emery wheel the chuck proper is removed from the cup or moved outward on the hub far enough to permit the arms to spring outward so that they will release the emery wheel and receive a new one. The chuck with the emery wheel in place is then moved inward. 9 denotes a nut which engages the threaded end of hub 2 and bears against the end of sleeve 6. This nut when turned to place forces the disk and arms inward and causes the inclines upon the outer faces of the arms to engage the incline upon the inner periphery of the cup thereby causing the arms to clamp the emery wheel with perfect rigidity, it being as a matter of fact immovable in use.

It will of course be apparent that the harder nut 9 is turned down on the hub the tighter the spring arms will be caused to engage the outer periphery of the emery wheel.

10 denotes bolts which pass through the bottom of disk 5 and bear upon the bottom of the cup or body.

It will of course be apparent that the chuck and emery wheel will in practice become set very tightly in the cup so that they will not readily start when nut 9 is loosened. The chuck and emery wheel however may be readily started by turning bolts 10 inward, these bolts acting to loosen the chuck in the cup or body and to force it outward carrying the emery wheel with it. Should the operative portion of the emery wheel become chipped in use, nut 9 is loosened, the chuck started outward and the emery wheel is changed ends with. When the emery wheel becomes worn down in use it may be set farther outward in the chuck. I find in practice that the spring arms grasp the emery wheel with such enormous power that but a short hold upon the emery wheel is necessary to hold it, thus permitting manufacturers to use these wheels until they are worn down very short. In order to make assurance doubly sure however I provide blocks 11 against which the inner face of the emery wheel may rest in adjusting the wheel after it has been worn down short. These blocks are provided with shanks 12 which lie in grooves 13 between the spring arms, the grooves being formed by simply widening certain of the cuts between the arms. The blocks are held in place by screws 14 which pass through holes 15 in the sides of the cup and engage the shanks. A number of holes (three being shown in the drawings) are provided for screws 14 so as to permit ample adjustment of the blocks. I have shown three blocks in the drawings, which number will be found quite sufficient in use.

Having thus described my invention, I claim—

1. A chuck of the character described consisting of a cup or body having a central hub threaded at its outer end, a disk having a sleeve adapted to slide over said hub and at its edge spring arms, and a nut adapted to engage the threaded end of the hub and bear against the end of the sleeve whereby the disk is forced inward on the hub and the spring arms are forced inward to grasp the periphery of an emery wheel.

2. A chuck of the character described consisting of a cup or body having a central hub threaded at its outer end, a disk having a sleeve adapted to pass over said hub, and spring arms at its outer end, a nut engaging the hub and acting to force the disk and spring arms inward, and bolts 10 in the disk which bear against the cup or body to start the disk when it is required to remove the emery wheel.

3. A chuck of the character described consisting of a cup or body, a disk having spring arms at its outer edge, certain of said arms having grooves between them, blocks 11 having shanks engaging said grooves, suitable means for locking said blocks in position to support the inner face of an emery wheel and suitable means for forcing the disk inward so that the spring arms will engage the inner periphery of the cup and be forced inward to grasp the periphery of the emery wheel.

In testimony whereof I affix my signature in presence of two witnesses.

JOHN T. GIBLIN.

Witnesses:
   GEO. W. JACKMAN,
   A. M. WOOSTER.